UNITED STATES PATENT OFFICE.

FRANZ SCHOLL AND ARNOLD HESS, OF HÖCHST-ON-THE-MAIN, GERMANY, ASSIGNORS TO THE FARBWERKE, VORMALS MEISTER, LUCIUS & BRÜNING, OF SAME PLACE.

DISAZO DYE AND PROCESS OF MAKING SAME.

SPECIFICATION forming part of Letters Patent No. 626,935, dated June 13, 1899.

Application filed August 20, 1898. Serial No. 689,141. (Specimens.)

*To all whom it may concern:*

Be it known that we, FRANZ SCHOLL, doctor of philosophy, and ARNOLD HESS, doctor of philosophy, citizens of the Empire of Germany, residing at Höchst-on-the-Main, Germany, have invented certain new and useful Improvements in the Manufacture of Basic Disazo Dyes and Process of Making Same, of which the following is a specification.

Our invention relates to the production of new basic azo dyestuffs derived from pyridin.

The process consists in diazotizing amidobenzylpyridinchlorid and combining it with primary amins—such as alpha-naphthylamin, amido-para-cresolether, meta-toluidin, and para-xylidin—then further diazotizing, and, finally, combining with a basic or phenol-like azo component.

As general formula of the new dyes may be given the following:

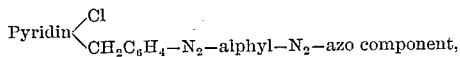

wherein "alphyl" means the radical of an aromatic primary amin and "azo component" the radical of a basic or phenol-like compound capable of combining with a diazo compound.

The new colors dye tannin-mordanted goods, as well as mixed goods, in an acid-bath in tints varying from yellow to brown and violet.

The new dyestuffs form dark powders easily soluble in water, insoluble in benzene, ether, ligroin, being separated from the aqueous solution by common salt, the tint of the solution being altered only slightly on addition of alkali, the dyestuffs being decomposed by reducing agents.

The process for the manufacture of these new dyestuffs is practically as follows:

Two hundred and twenty parts, by weight, of amidobenzylpyridinchlorid, obtained by reducing nitrobenzylpyridinchlorid with zinc-dust, are diazotized in an aqueous solution with one calculated quantity of nitrite, whereupon are added one hundred and seven parts, by weight, of the hydrochloric-acid solution of meta-toluidin, and on addition of sodium acetate the monoazo dyestuff thus formed is separated. To the latter is added with cooling in a hydrochloric-acid solution the calculated quantity of nitrite as well as a solution of one hundred and forty-four parts, by weight, of beta-naphthol, forty parts, by weight, of caustic soda, and eighty parts, by weight, of sodium acetate. The new dyestuff separates for the most part at once, and after gently heating the rest is precipitated by an addition of common salt.

Having now described our invention, what we claim is—

1. The process of producing new disazo dyestuffs, which consists in diazotizing amidobenzylpyridinchlorid and combining it first with a primary aromatic amin, then further diazotizing and combining it with an azo component, substantially as set forth.

2. The process of producing new disazo dyestuffs, which consists in combining diazotized amidobenzylpyridinchlorid with meta-toluidin, then further diazotizing and combining it with beta-naphthol, substantially as set forth.

3. As new products, obtained from diazotized amidobenzylpyridinchlorid and primary aromatic amins, further diazotized and combined with azo components, the new dyestuffs forming dark powders, easily soluble in water, insoluble in benzene, ether, ligroin, being separated from the aqueous solution by common salt, the tint of the solution being altered slightly on addition of alkali, the dyestuffs being decomposed by reducing agents, substantially as set forth.

4. As a new article of manufacture, the specific dyestuff obtained from diazotized amidobenzylpyridinchlorid and meta-toluidin, then further diazotized and combined with beta-naphthol, being a dark-green brilliant powder easily soluble in hot water with a red color, being dissolved by concentrated sulfuric acid with a green color and dyeing mordanted cotton or mixed goods with a bluish-red color, substantially as set forth.

In testimony that we claim the foregoing as our invention we have signed our names in presence of two subscribing witnesses.

FRANZ SCHOLL.
ARNOLD HESS.

Witnesses:
HEINRICH HAHN,
ALFRED BRISBOIS.